No. 672,016. Patented Apr. 16, 1901.
W. M. S. SELWYN.
AUTOMATIC APPARATUS FOR MEASURING LIQUIDS.
(Application filed Feb. 24, 1896.)
(No Model.) 3 Sheets—Sheet 1.
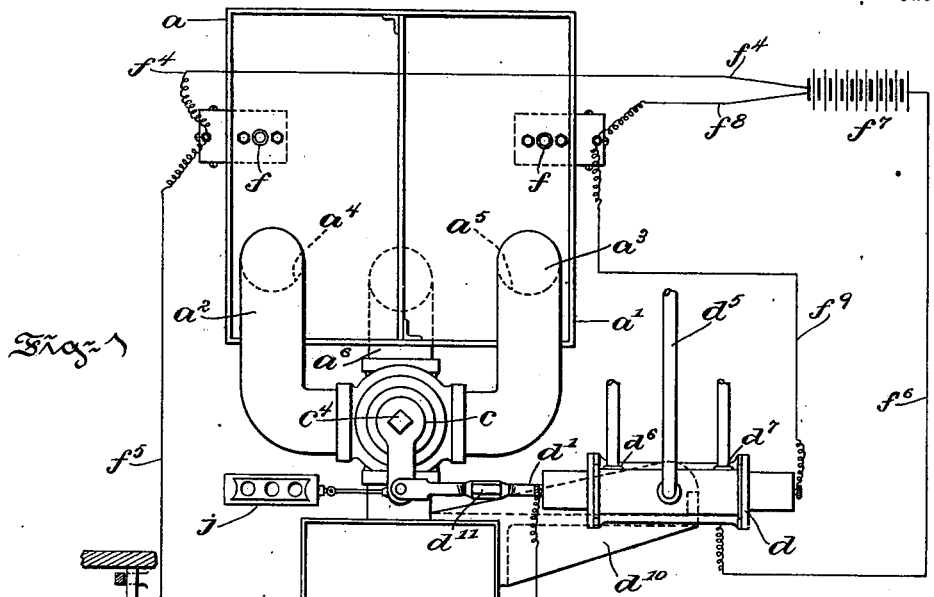
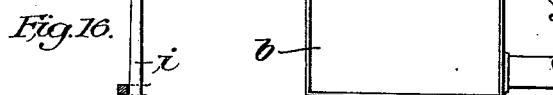
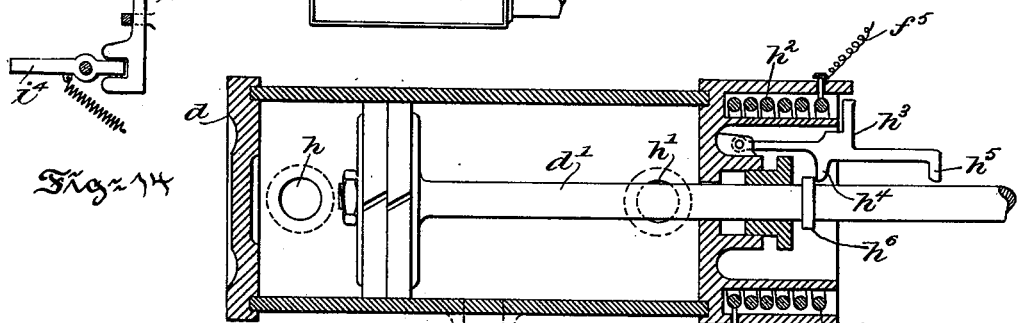
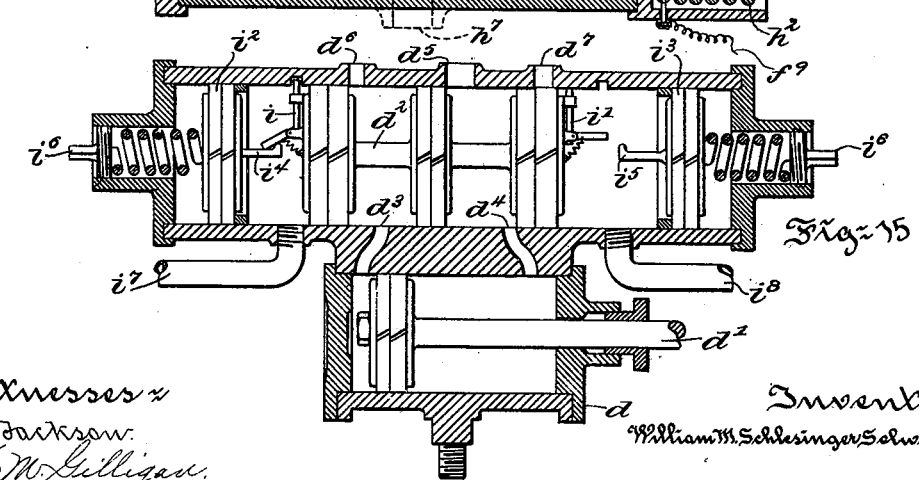
Witnesses:
W. S. Jackson.
K. M. Gilligan.
Inventor.
William M. Schlesinger Selwyn.
By Augustus B. Stoughton
Attorney.

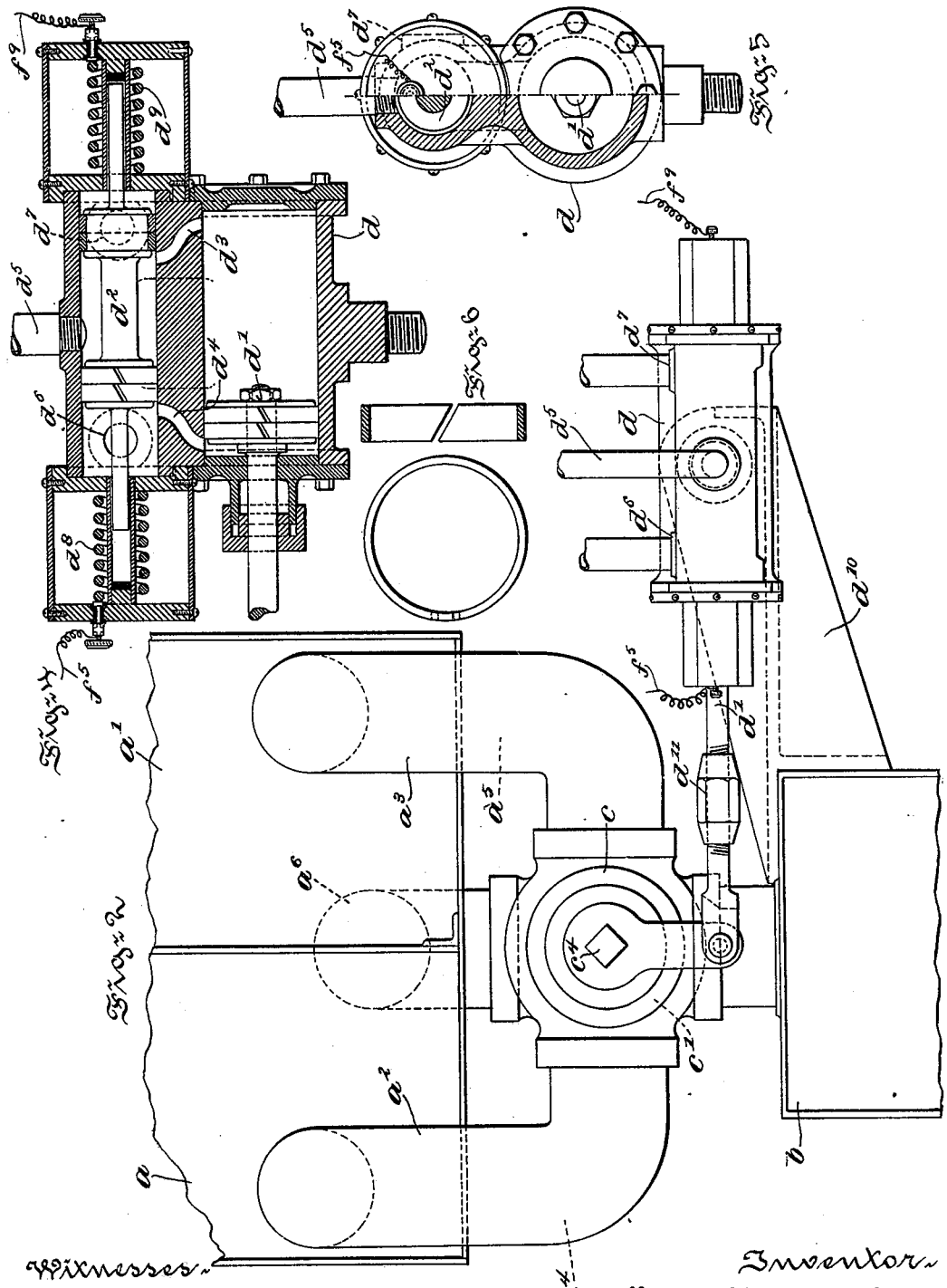

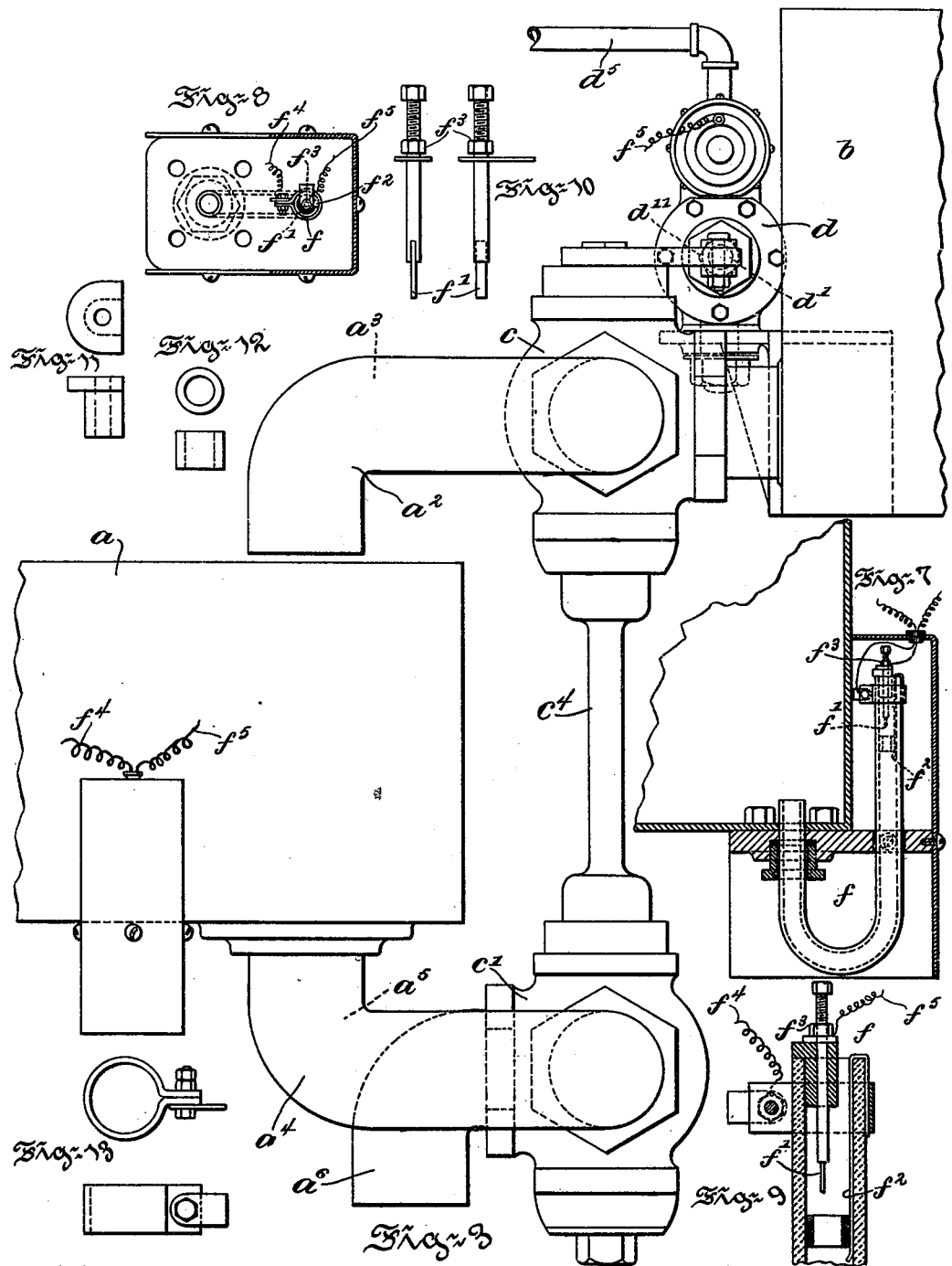

UNITED STATES PATENT OFFICE.

WILLIAM M. SCHLESINGER SELWYN, OF PHILADELPHIA, PENNSYLVANIA, ASSIGNOR OF ONE-HALF TO CHARLES F. VAN HORN AND JOHN I. McDUFFEE, OF SAME PLACE.

AUTOMATIC APPARATUS FOR MEASURING LIQUIDS.

SPECIFICATION forming part of Letters Patent No. 672,016, dated April 16, 1901.

Application filed February 24, 1896. Serial No. 580,338. (No model.)

*To all whom it may concern:*

Be it known that I, WILLIAM M. SCHLESINGER SELWYN, a subject of Her Majesty the Queen of England, residing at the city of Philadelphia, in the county of Philadelphia and State of Pennsylvania, have invented certain new and useful Improvements in Automatic Apparatus for Measuring Liquids, of which the following is a specification.

The principal object of my present invention is to provide simple, durable, efficient, and reliable apparatus for accurately measuring fluids or liquids in respect to weight; and to this end my invention consists in the improvements hereinafter described and claimed.

The nature, characteristic features, and scope of my invention will be more fully understood from the following description, taken in connection with the accompanying drawings, forming part hereof, and in which—

Figure 1 is a diagrammatic plan view illustrating my invention in application to the measurement of liquids by weight and by the employment of electromechanical devices. Fig. 2 is a top or plan view drawn to an enlarged scale and illustrating portions of the apparatus shown in Fig. 1. Fig. 3 is an elevational view of portions of the apparatus shown in Figs. 1 and 2. Fig. 4 is a longitudinal central sectional view drawn to an enlarged scale and illustrating the portion of my invention which relates to the motor and some of its accessories. Fig. 5 is an end view, partly in section and partly in elevation, of the motor shown in Fig. 4. Fig. 6 is an enlarged view illustrating in elevation and section one of the ring-packings of the motor-piston. Fig. 7 is a detached sectional view of the gage shown in Figs. 1 and 3. Fig. 8 is a top view of the gage with the upper portion of its housing removed. Figs. 9, 10, 11, 12, and 13 are views illustrating details of the gage. Fig. 14 is a central sectional view of a modified form of electrically-controlled motor. Fig. 15 is a similar view of a mechanically-controlled motor, and Fig. 16 is a detached view illustrating upon an enlarged scale a part of the motor shown in Fig. 15.

Referring to the drawings, $a$ and $a'$ are tanks or receptacles in which the liquid is measured. These tanks or receptacles may consist of one vessel divided by a partition-wall, and their number is not material, it being within the scope of my invention to increase or diminish the number of tanks, as circumstances may require. There is of course present a source of supply of the fluid to be measured, and I have indicated such a source of supply as consisting of a reservoir $b$; but of course the source of supply and the means for receiving the measured liquid are not material parts of my invention. Each of the tanks above referred to is provided with an inlet and outlet having means for arresting the discharge of fluid or liquid through it. For the sake of a description of my invention I have shown in the drawings valved inlet and outlet pipes for the tanks, and I have designated these respectively $a^2 a^3$ and $a^4 a^5$. The inlet pipe or pipes communicate with a source of supply, as $b$, and the outlet-pipes communicate with a suitable discharge device or provision, as $a^6$. In cases where two tanks or a divided or partitioned tank are employed, for example, in apparatus like that illustrated in Figs. 1, 2, and 3, the inlet and outlet pipes may be provided with three-way valves $c$ and $c'$, which serve to admit the liquid or fluid to be measured from the source of supply either to one or the other of the tanks and to permit of the escape of the liquid from either one or the other of the tanks to the discharge device or provision $a^6$, and in this connection it may be stated that these valves are designed and arranged in such manner that when one of the tanks is emptying the other is filling, and vice versa. The plugs or operative parts of the inlet and outlet valves are mechanically connected. In the embodiment of my invention illustrated in the drawings this result is accomplished by connecting these plugs together by means of a rod $c^4$. A motor is employed for operating these valves, and this motor may vary in its construction and in its turn is controlled by the liquid or fluid to be measured either through the intervention of electromechanical or mechanical devices. Moreover, the motor may be driven by steam or hydraulically, or it may be driven by the head of the liquid which is measured. Referring to the drawings, and more particularly to Fig. 4, the motor $d$ comprises a piston, cylinder, and piston-rod $d'$, a balanced slide-valve $d^2$, and their complemental ports $d^3$ and $d^4$. The fluid or substance which is to drive the motor enters by way of the inlet-pipe $d^5$ and passes thence by way of the ports $d^3$ or $d^4$ and is exhausted by way of the outlets $d^6$ or $d^7$, according to the position of the slide-valve $d^2$ and in a manner well understood, with the result that the piston and its rod $d'$ are shifted in one direction or the other. The slide-valve may be suitably packed, for example, by means of split rings, (shown in Fig. 6,) although other types of packing may be employed. In the type of motor shown in Fig. 4 the slide-valve carries the cores of solenoids or electromagnets $d^8$ and $d^9$. When one of these solenoids or electromagnets is energized, its armature or core is attracted or drawn into it, with the result that the slide-valve is shifted. When the slide-valve has once been shifted, it remains in position and the available head or pressure of the substance which actuates the motor continues to operate upon the piston, and thus hold it against displacement until the slide-valve has been again shifted. In fact, the piston is not only held in the manner above described against accidental displacement, but is returned to proper position if accidentally moved. The piston-rod affords efficient means for operating the valves which control the entrances and exits to and from the tanks. In Fig. 2 I have illustrated one type of mechanism for accomplishing this result—namely, a crank-arm connected with the valve-spindle and with the piston-rod and a bracket $d^{10}$, to which the motor is pivoted. In addition I have shown a turnbuckle $d^{11}$, by means of which the length of the piston-rod may be increased or diminished, as required and for purposes of adjustment.

The measurement by weight of the fluid in the tanks controls the motor either through the intervention of electromechanical or mechanical connections. In Figs. 1, 2, 3, 7, 8, and 9 I have shown the motor controlled by electromechanical devices responding to the weight of the fluid in the tank. Referring to said figures, $f$ is a gage, which may comprise a U-shaped tube adapted to contain a fluid, as mercury. This tube communicates with the interior of the tank and is provided with contacts, as $f'$ and $f^2$. Normally the level of the liquid in this tube is beneath the contacts $f'$ and $f^2$. However, when the tank is filled the hydrostatic pressure of the liquid contained in it will cause the fluid to rise in the tube, and thus connect electrically the contacts $f'$ and $f^2$. One or both of the contacts $f'$ and $f^2$ may be made adjustable. In the present instance the contact $f'$ is provided with a threaded shank and with a suitable adjusting-nut, as $f^3$. This adjustment provides means for causing the fluid in the tube to close the circuit when the liquid in the tank is of predetermined weight. When the liquid contained in the tank has acquired sufficient weight, it causes the fluid in the tube to rise and complete the circuit by way of the contacts $f'$ and $f^2$ and circuit connections $f^4 f^5$, solenoid $d^8$, motor-frame, conductor $f^6$, to the battery $f^7$. Under these circumstances the solenoid $d^8$ is energized and the slide-valve is shifted so as to reverse the position of the piston and of the valves that control the inlets and outlets of the tanks. The tank—for example, the tank $a$—which was previously filled is then emptied while the tank $a'$ is filling. As the tank $a$ is emptying the column of fluid in its gage sinks, and thus interrupts the circuit connections to $d^8$. When the liquid in the tank $a'$ reaches a sufficient height, its gage completes the circuit by way of the conductors $f^8 f^9$, solenoid $d^9$, frame of motor, and conductor $f^6$. Under these circumstances the solenoid $d^9$ is energized, and this causes the motor to again reverse the position of the valves.

The motor shown in Fig. 14 is a modification of the motor already described. Referring to said figure, $h$ and $h'$ are openings that may be connected, respectively, with the interiors of the tanks $a$ and $a'$. $h^2$ is a solenoid or electromagnet whose armature $h^3$ may be pivoted and is provided with fingers, as $h^4$ and $h^5$, adapted to lock the piston-rod, for example, through the intervention of a collar $h^6$. Assuming, for the sake of description, that the tank $a$ is filling and the tank $a'$ is emptying and that the parts of the motor are in the positions illustrated in Fig. 14 and that the solenoid or electromagnet $h^2$ is connected in a circuit which branches to the gages of each of the tanks, it will be apparent that the hydrostatic pressure of the fluid in the tank $a$ operates by way of the opening $h$ upon the left-hand face of the piston. The piston will not move, because it is locked by the finger $h^4$. The level of the liquid rises in the tank $a$ and finally operates upon its gage to close the circuit through the electromagnet or solenoid $h^2$ in the manner above described, whereupon the solenoid attracts its armature, and thus draws the finger $h^4$ clear of the piston-rod, so that the latter moves toward the right, and thus reverses the position of the inlet and outlet valves of the tanks in the manner described and so that the tank $a$ is emptied and the tank $a'$ is filled. As the tank is emptying the circuit is interrupted, the electromagnet $h^2$ is demagnetized, and the finger $h^5$ falls behind—that is, to the left of—the collar $h^6$, and thus locks the piston against movement. When the tank $a'$ in its turn is filled, it causes its gage to complete the circuit and magnetize the electromagnet $h^2$, with the result that the pressure of fluid in the tank $a'$, entering by way of the opening $h'$, shifts the piston toward the left and reverses the inlet and outlet valves of the tank. In the foregoing description it has been assumed that the liquid in the tanks is employed for operating the motor. Under these circumstances the exhaust from the motor is back into the tanks, and this is possible because one of the tanks is always emptying while the other is filling. By providing this cylinder with a centrally-disposed outlet, as $h^7$, the use of the outlet-valves and connections may be dispensed with, as the tank will empty through this opening. While I have described the motor shown in Fig. 14 in connection with the measurement of liquids by weight and with the liquid-pressure gages illustrated in Fig. 1, still this motor may be readily employed without the exercise of invention in connection with other pressure-gages.

The motor shown in Fig. 15 is designed for use in connection with the measurement of liquids by weight. In it I provide a slide-valve having spring-catches $i$ and $i'$, Fig. 16, tending to engage recesses in the walls of the valve-chamber, so as to lock the valve in position. $i^2$ and $i^3$ are spring-cushioned pistons provided with projections $i^4$ and $i^5$ for releasing the spring-catches $i$ and $i'$. The springs of these pistons may be adjusted by means of nuts $i^6$. $i^7$ and $i^8$ are pipes that communicate, respectively, with the interiors of the tanks $a$ and $a'$ and with the spaces in the valve-chamber between the pistons $i^2$ and $i^3$ and the outside ends of the slide-valve. When the liquid in the tank $a$ has reached a predetermined weight, its hydrostatic pressure transmitted by way of the pipe $i^7$ overcomes the spring-pressure upon the piston $i^2$ and shifts it toward the left far enough to release the spring-catch $i$ and then forces the valve to move toward the right. This movement of the valve sets the motor in operation and causes it to reverse the positions of the inlet and outlet valves of the tanks $a$ and $a'$. Subsequently the weight of liquid in the tank $a'$ operates by way of the tube or pipe $i^8$ to effect a reversal of the slide-valve and a subsequent operation of the motor.

Among the many advantages of apparatus embodying features of my invention attention may be called to the following: The mechanism which controls the motion of the motor-piston responds to the weight or quantity of liquid in the tank and is wholly independent of the motion of the motor-piston, so that the piston when once brought to position corresponding with the contents of the tanks is held in such position until released by the change in the contents of the tanks necessary to operate said mechanism. Thus the piston is held against accidental displacement. This is of course important and insures accuracy of measurement. Moreover, in measuring liquids by weight use is made of a fixed tank and the weight of the whole is ascertained by actually weighing only a small column corresponding in cross-sectional area with the area of the passage that leads to the gage or to the spring-balanced piston or other device employed. This avoids the possibility of error which would be introduced by the momentum of the liquid entering the tank. It has been already explained how predetermined quantities by weight are collected in and subsequently discharged from the tank or tanks. Clearly by keeping a record of the number of times the tank or tanks is or are emptied it is possible to readily ascertain the quantity of liquid passed through the apparatus. However, to facilitate the attainment of this result I may provide a counter $j$, Fig. 1, and connect it with some suitable part of the apparatus that is moved by the motor—for example, with the crank on the spindle of the valves that control the tank inlets and outlets.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

1. Automatic apparatus for weighing liquids, comprising the combination of a weighing tank or receptacle having valved inlet and outlet connections, a motor for controlling the valves of said connections, substantially as described, motor-valve gear, and means responding to changes in the hydrostatic pressure in contradistinction to buoyancy of the contents of the tank for operating said valve-gear, for the purposes set forth.

2. Automatic apparatus for weighing liquids, comprising the combination of a fixed weighing tank or receptacle having valved inlet and outlet connections, a motor for controlling the valves of said connections, electromechanical connections, and means responding to changes in the hydrostatic pressure of the contents of the tank and actuating the valve of the motor through said connections, substantially as described.

3. Automatic apparatus for weighing liquids, comprising the combination of a fixed weighing-tank having valved inlet and outlet connections, a motor for shifting the valves of said connections, electromagnetic devices and their circuit connections for operating the motor-valve, and a circuit-controller responding to changes in the hydrostatic pressure of the contents of the tank and operating to make and break said circuit connections, substantially as described.

4. Automatic apparatus for weighing liquids, comprising the combination of a fixed weighing-tank having a valved inlet and outlet, a motor for operating said inlet and outlet, motor-valve gear, and means responding to changes in the hydrostatic pressure of the contents of the tank for operating said valve-gear, substantially as described.

5. Automatic apparatus for weighing liquids, comprising the combination of a fixed weighing-tank, a motor controlling the filling and emptying of said tank, electrical devices and means responding to changes in the hydrostatic pressure of the contents of the tank for controlling the motor through said devices, substantially as described.

6. Automatic apparatus for weighing liquids, comprising the combination of a fixed tank having a plurality of compartments, valved inlets and outlets for said compartments, a source of fluid-supply, a motor controlling the filling and emptying of said compartments, whereby when one is filling the other is emptying, electrical devices and means responding to changes in the hydrostatic pressure of the contents of the tank and operating to control the motor through said devices, substantially as described.

7. A fluid-weighing machine comprising the combination of a fixed tank, valved inlet and outlet fluid connections for said tank, a pressure-gage connected with the bottom of the tank and indicating the hydrostatic pressure of a portion of its fluid contents, a motor for shifting the valves of said connections, electrical devices and means responding to the indicated pressure for controlling the motor through said devices, substantially as described.

In testimony whereof I have hereunto signed my name.

WILLIAM M. SCHLESINGER SELWYN.

Witnesses:
K. M. GILLIGAN,
W. J. JACKSON.